(12) United States Patent
Pei

(10) Patent No.: US 11,502,949 B2
(45) Date of Patent: Nov. 15, 2022

(54) VIRTUALIZED WIRELESS MESH IN AIRPLANE CABIN FOR DETERMINISTIC TOPOLOGY CONTROL

(71) Applicant: THE BOEING COMPANY, Chicago, IL (US)

(72) Inventor: Guangyu Pei, Issaquah, WA (US)

(73) Assignee: THE BOEING COMPANY, Chicago, IL (US)

( * ) Notice: Subject to any disclaimer, the term of this patent is extended or adjusted under 35 U.S.C. 154(b) by 303 days.

(21) Appl. No.: 16/809,072

(22) Filed: Mar. 4, 2020

(65) Prior Publication Data

US 2021/0281509 A1 Sep. 9, 2021

(51) Int. Cl.
| | | |
|---|---|---|
| H04L 45/586 | (2022.01) | |
| H04L 67/12 | (2022.01) | |
| H04W 4/40 | (2018.01) | |
| H04W 84/22 | (2009.01) | |
| H04W 88/18 | (2009.01) | |
| H04L 67/63 | (2022.01) | |

(52) U.S. Cl.
CPC ............ *H04L 45/586* (2013.01); *H04L 67/12* (2013.01); *H04L 67/63* (2022.05); *H04W 4/40* (2018.02); *H04W 84/22* (2013.01); *H04W 88/18* (2013.01)

(58) Field of Classification Search
CPC ..... H04L 45/586; H04L 67/12; H04L 67/327; H04W 4/40; H04W 84/22; H04W 88/18
USPC ........................................................ 370/254
See application file for complete search history.

(56) References Cited

U.S. PATENT DOCUMENTS

| | | | | |
|---|---|---|---|---|
| 2012/0303835 A1* | 11/2012 | Kempf | ............... | H04L 43/0882 709/235 |
| 2018/0227719 A1* | 8/2018 | Chong | ............... | H04L 12/4641 |
| 2018/0375841 A1* | 12/2018 | Tola | ................... | H04L 63/0478 |

OTHER PUBLICATIONS https://www.threadgroup.org, "What is Thread", 9 pgs., 2019.
https://openthread.io, "Open Thread", 11 pgs., 2020.

* cited by examiner

*Primary Examiner* — Candal Elpenord
*Assistant Examiner* — Syed M Bokhari
(74) *Attorney, Agent, or Firm* — Marshall, Gerstein & Borun LLP

(57) ABSTRACT

Systems, methods, and computer-readable media storing instructions for handling wireless communication in wireless mesh networks are disclosed herein. The disclosed techniques virtualize a portion of the communications within the wireless mesh network by implementing a plurality of virtual routers on a server, each virtual router corresponding to a physical router device within the wireless mesh network. Each physical router device is connected to its corresponding virtual router by a deterministic connection, which may include a wired connection to the server. A virtual communication layer implemented by the server is configured to router inter-router communication between the virtual routers. In some embodiments, each virtual router is implemented within a separate container within a virtual mesh network environment running on the server.

17 Claims, 5 Drawing Sheets

VIRTUALIZED WIRELESS MESH IN AIRPLANE CABIN FOR DETERMINISTIC TOPOLOGY CONTROL

FIELD

This disclosure relates to systems and methods for handling wireless communication in wireless mesh networks.

BACKGROUND

Mesh networks for wireless communication between electronic devices have been developed to provide stable connections in response to changing conditions affecting a local environment. Such mesh networks use non-deterministic communication protocols to establish non-deterministic communication connections between nodes within the networks. Nodes within the wireless mesh network may be connected to multiple other nodes to provide multiple redundant paths through the network. A robust wireless network topology is thus established, such that failure of a node or a link between nodes does not disconnect part of the network. Although such mesh network architecture provides robust communications for wireless systems, it also results in a significant increase in wireless communication within the network environment, resulting in congestion in the frequency band used by the network. The increased network traffic thus necessitates additional hardware to handle the increased over-the-air network traffic, such as the installation of additional routers to accommodate receiving and transmitting duplicate messages within the wireless mesh network.

Some environments, such as aircraft cabins, have sufficient network density and sufficiently stable environments for wireless communication that redundant connections between routers within the network are unnecessary. Because routers can still fail, however, the redundant communication protocols of mesh networks are still useful for maintaining redundant connections between end nodes (e.g., low-power wireless sensors) and router nodes in such environments. Additionally, extensive and standardized code libraries have been developed for wireless mesh networks, which offer advantages in device interoperability and network stability if such existing code can be used. However, existing wireless mesh protocols are designed for redundant wireless links for both end nodes and router nodes, so existing code libraries cannot be directly used to achieve a wireless mesh network without redundant wireless communication between routers. The limitations of existing systems thus result in over-the-air congestion due to unnecessary wireless communication between routers. Techniques for overcoming such limitations in handling wireless communication in wireless mesh networks would be advantageous in aircraft and other environments in which the wireless network topology is relatively stable.

SUMMARY

An example wireless communication system for handling wireless communication in wireless mesh networks comprises: a server and a plurality of physical router devices connected to the server and configured to communicate wirelessly with a plurality of low-power wireless devices. The server further comprises one or more processors, a communication interface, and a computer-readable memory storing executable instructions. The communication interface is configured to communicate between the one or more processors of the server and the plurality of physical router devices via a deterministic connection with each of the physical router devices. The executable instructions, when executed by the one or more processors, cause the server to implement a virtual mesh network environment, comprising a plurality of virtual routers and a virtual communication layer configured to route inter-router communication between the plurality of virtual routers. The virtual routers are configured to communicate with the plurality of low-power wireless devices through the plurality of physical router devices, wherein each of the virtual routers corresponds to one of the physical router devices.

An example method for handling wireless communication in wireless mesh networks comprises: implementing a plurality of virtual routers within a virtual mesh network environment by one or more processors of a server; establishing a deterministic connection between each of the plurality of virtual routers and each of a plurality of physical router devices via a communication interface of the server, wherein the physical router devices are configured to communicate wirelessly with a plurality of low-power wireless devices, and wherein each of the virtual routers corresponds to one of the physical router devices and is configured to communicate with the plurality of low-power wireless devices through such corresponding physical router device; implementing a virtual communication layer configured to route inter-router communication between the plurality of virtual routers by the one or more processors of the server; receiving data from the plurality of low-power wireless devices at the plurality of physical router devices; and communicating the data to a client application external to the virtual mesh network environment from at least one of the plurality of virtual routers by the one or more processors of the server.

An example tangible, non-transitory computer-readable medium storing executable instructions for handling wireless communication in wireless mesh networks comprises executable instructions that, when executed by at least one processor of a computer system, cause the computer system to: establish a deterministic connection with each of a plurality of physical router devices configured to communicate wirelessly with a plurality of low-power wireless devices and implement a virtual mesh network environment. The virtual mesh network environment comprises: a plurality of virtual routers configured to communicate with the plurality of low-power wireless devices through the plurality of physical router devices, wherein each of the virtual routers corresponds to one of the physical router devices; and a virtual communication layer configured to route inter-router communication between the virtual routers.

The virtual routers may be implemented within separate containers running within the virtual mesh network environment. The deterministic connection may be a wired connection between the server and each of the physical router devices. The plurality of low-power wireless devices may include a plurality of low-power wireless sensors disposed within an aircraft. The server may be a cabin server within the aircraft. The plurality of physical router devices may be connected to the server via a plurality of separate wired connections.

The features, functions, and advantages that have been discussed can be achieved independently in various embodiments or may be combined in yet other embodiments further details of which can be seen with reference to the following description and drawings.

DESCRIPTION

Disclosed herein are systems, methods, and non-transitory computer-readable media storing instructions for handling wireless communication in wireless mesh networks by implementing a virtual mesh network environment including a plurality of virtual routers corresponding to a plurality of physical router devices within the wireless mesh network. The disclosed techniques virtualize a portion of the wireless mesh network in a computer system (e.g., a server) to facilitate the use of a deterministic communication connection between selected nodes (e.g., router nodes) within the wireless mesh network and the computer system. Such deterministic connections reduce wireless communication band congestion in the wireless mesh network environment. A virtual communication layer enables communication between the virtual routers within the virtual mesh network environment running on the computer device as though such virtual routers were communicating via wireless communication as physical router devices in a traditional wireless mesh network. Such virtual communication thus maintains the robustness of existing wireless mesh network protocols, while reducing wireless communication band congestion.

Figure 1:
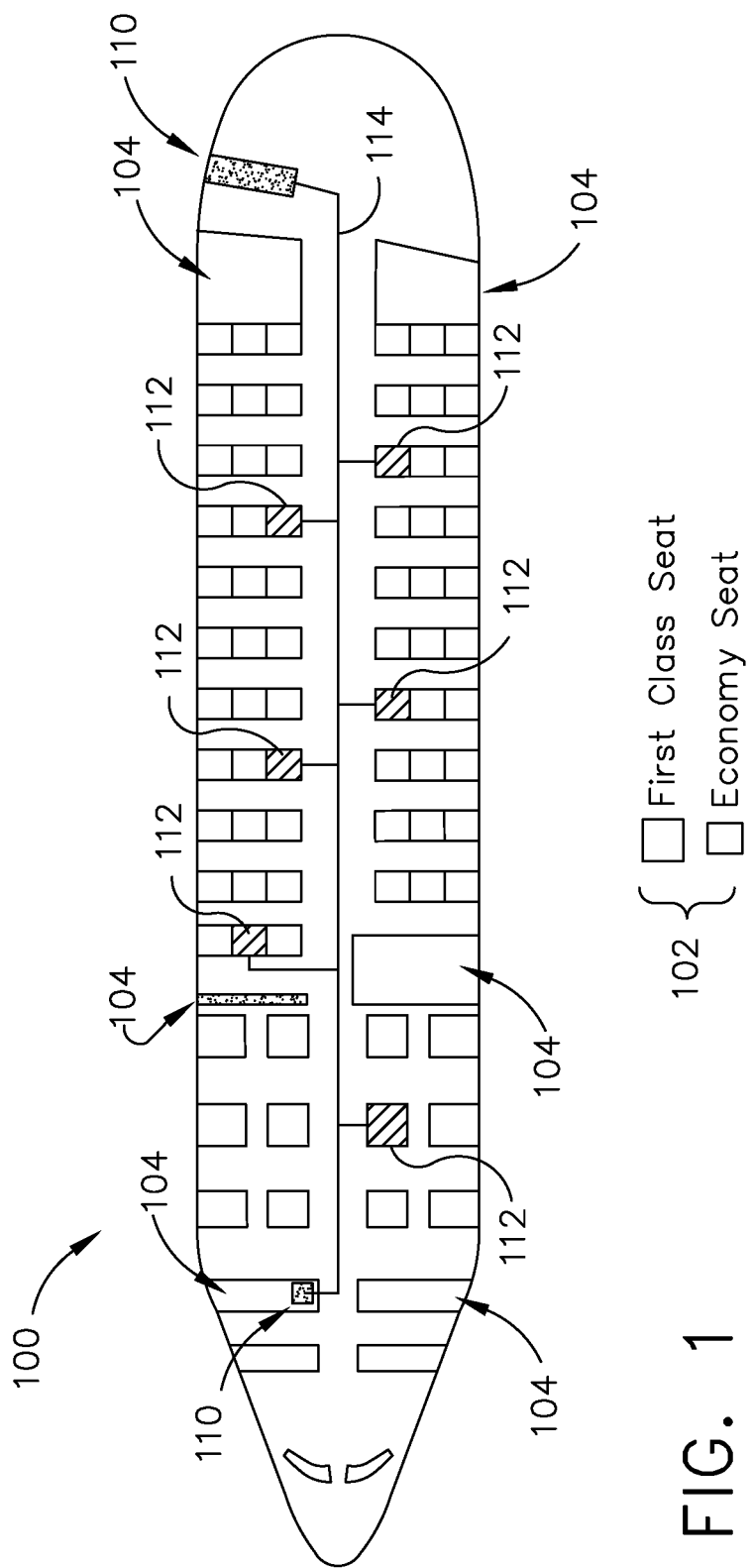
FIG. 1 is a top cross-sectional view of an aircraft having a wireless mesh network.

FIG. 1 is a top cross-sectional view of an aircraft 100 having a wireless mesh network. The exemplary aircraft 100 is illustrated as having a cabin area containing a plurality of seats 102 and other installed components, such as obstructions 104. The seats 102 include a plurality of first class seats and a plurality of economy seats, which are arranged around the obstructions 104. The aircraft 100 further includes one or more servers 110, which may be cabin servers within the aircraft cabin. Each server 110 is connected to a plurality of router devices 112 by one or more wired connections 114. In some embodiments, each router device 112 is connected to the server 110 by a separate wired connection 114. In other embodiments, a common wired connection 114 serves to connect multiple router devices 112 to the server 110.

The router devices 112 are physical router devices configured to communicate wirelessly with additional wireless end-node devices (not shown), such as the low-power wireless devices 116 discussed below. The router devices 112 are illustrated as being located at the sites of various seats 102 for convenience, but such router devices 112 may instead be located at other sites within the aircraft 100. For example, the router devices 112 may be disposed beneath or within seats 102, below a floor, within a ceiling, or at other locations within the aircraft 100. Similarly, each server 110 may be located at any convenient location within the aircraft 100.

Figure 2:
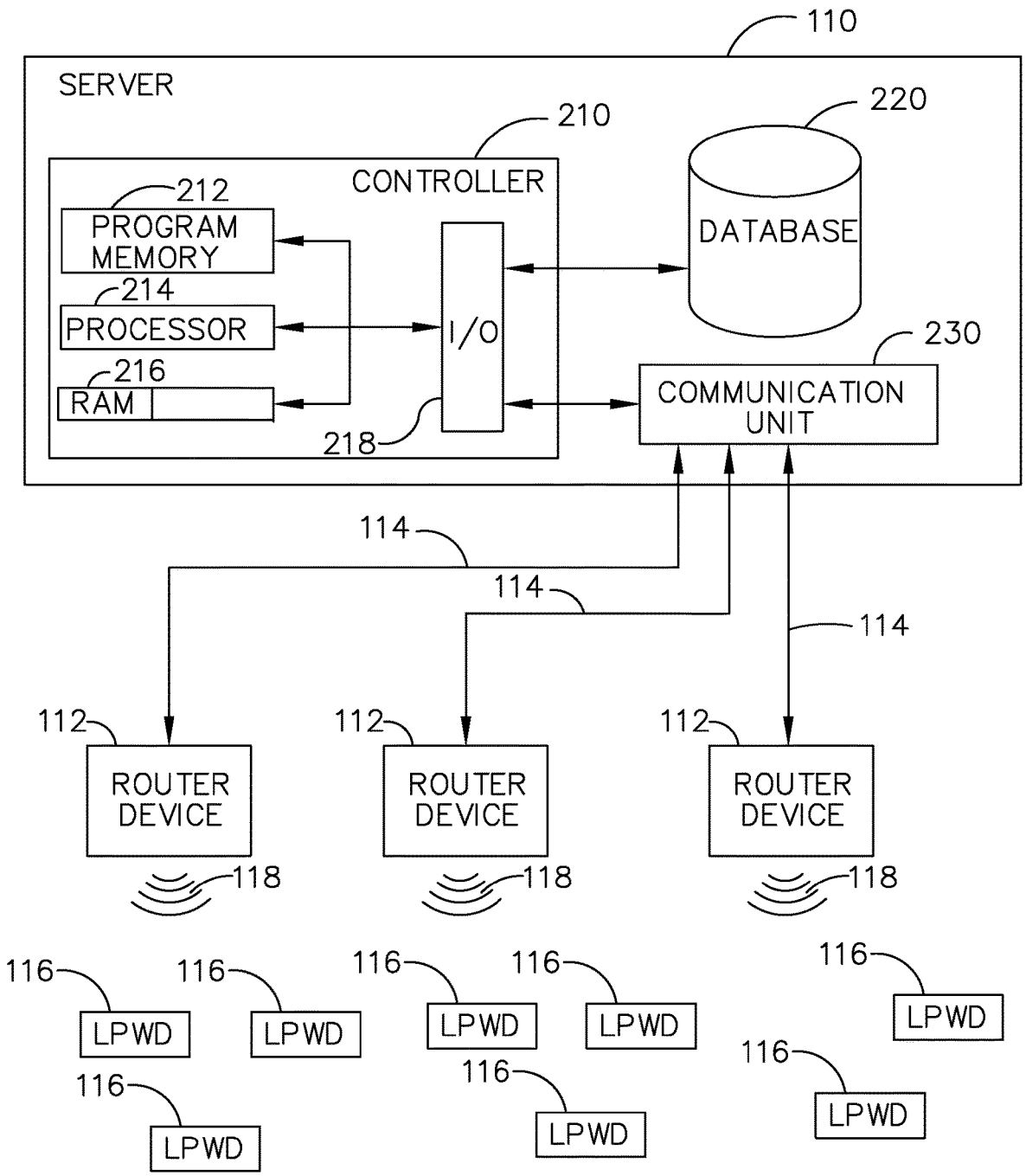
FIG. 2 is a block diagram of a wireless communication system for handling wireless communication in wireless mesh networks.

FIG. 2 is a block diagram of a wireless communication system 200 for handling wireless communication in wireless mesh networks. The wireless communication system 200 includes a server 110 configured to perform part or all of the techniques described herein. The wireless communication system 200 further includes a plurality of router devices 112 communicatively coupled to the server 110 by wired connections 114. A plurality of low-power wireless devices (LPWDs) 116 are communicatively connected to the router devices 112 by wireless connections 118. In some embodiments, the server 110 stores and executes computer-readable instructions to implement a virtual mesh network environment 410 and related software applications, as described in further detail below.

The server 110 includes a controller 210, a database 220, and a communication unit 230. The controller includes one or more of each of the following: a program memory 212, a processor 214, and a random access memory (RAM) 216. Each program memory 212 is a non-transitory, tangible memory device configured to store electronic data, such as executable instructions for implementing processes, routines, and software programs. Each processor 214 is adapted and configured to execute computer-executable instructions, such as software programs, applications, and routines. Each RAM 216 is configured as a volatile memory for storing electronic data while in use. Each of the program memory 212, processor 214, and RAM 216 is connected to an input/output (I/O) circuit 218, which I/O circuit 218 also connects the controller 210 to the other components of the server 110 (i.e., the database 220, the communication unit 230, and any displays or other components not shown). The database 220 is configured to store electronic data in a non-transitory, tangible memory device for use by software applications. In some embodiments, the database 220 and the program memory 212 may be combined into a single memory. The communication unit 230 is a component of the server 110 configured to manage communication between the controller 210 and external devices that are communicatively connected to the server 110, such as the router devices 112.

Each of the router devices 112 is a physical router device within the wireless communication system 200 that is configured to communicate via wireless communication with one or more LPWDs 116 as part of a wireless mesh network. The router devices 112 are connected to the communication unit 230 of the server 110 via a deterministic connection. Although illustrated as a wired connection 114, the deterministic connection by which a router device 112 is connected to the communication unit 230 of the server 110 includes deterministic wireless connections in some embodiments. The deterministic connection further connects each router device 112 to a unique virtual representation of such router device 112 within the server 110, as discussed further below.

A plurality of LPWDs 116 are communicatively connected to the various router devices 112 via wireless connections 118. Each LPWD 116 may be configured to communicate with a plurality of router devices 112 or may communicate with one of the router devices 112 at a time. For example, each LPWD 116 may broadcast wireless messages to all router devices 112 within signal range of such LPWD 116, in which case the server 110 may identify one of the router devices 112 as receiving the wireless messages from the LPWD 116. In some embodiments, the LPWDs 116 are low-power wireless sensors communicating sensor data, such as low-power wireless sensors disposed within an aircraft 100. Such low-power wireless sensors may be disposed throughout the cabin of the aircraft 100 to provide sensor data to a cabin server within the aircraft 100, which may be the server 110. Additionally or alternatively, the LPWDs 116 may be wireless devices configured to control various actions, information presentation, or devices within the aircraft 100. The LPWDs 116 are configured to communicate wireless with the router devices 112 according to low-power wireless communication protocols, which may include wireless mesh network communication protocols.

Additional or alternative embodiments of the wireless communication system 200 may include fewer, additional, or alternative components, as well as any combination of components illustrated in FIG. 2.

Figure 3B:
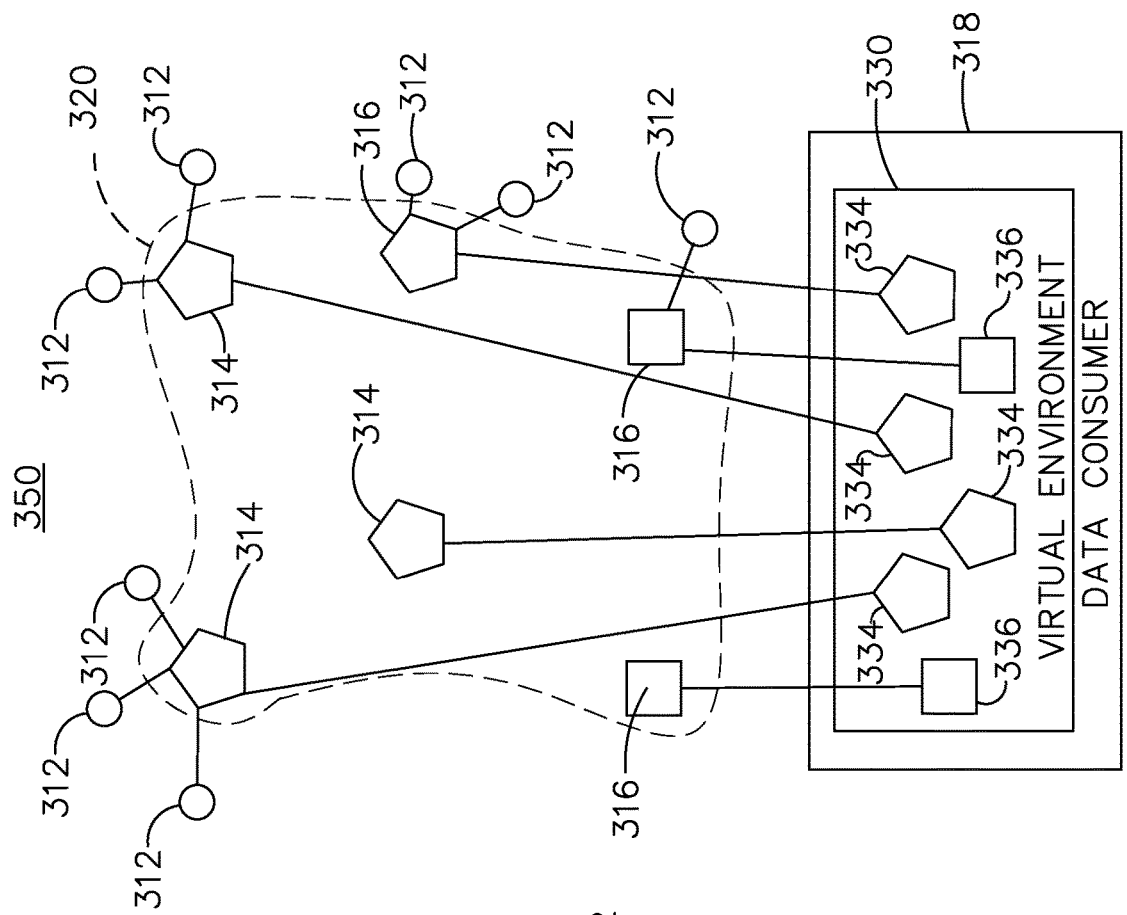
FIG. 3B is a block diagram of a partially deterministic wireless mesh network.
Figure 3A:
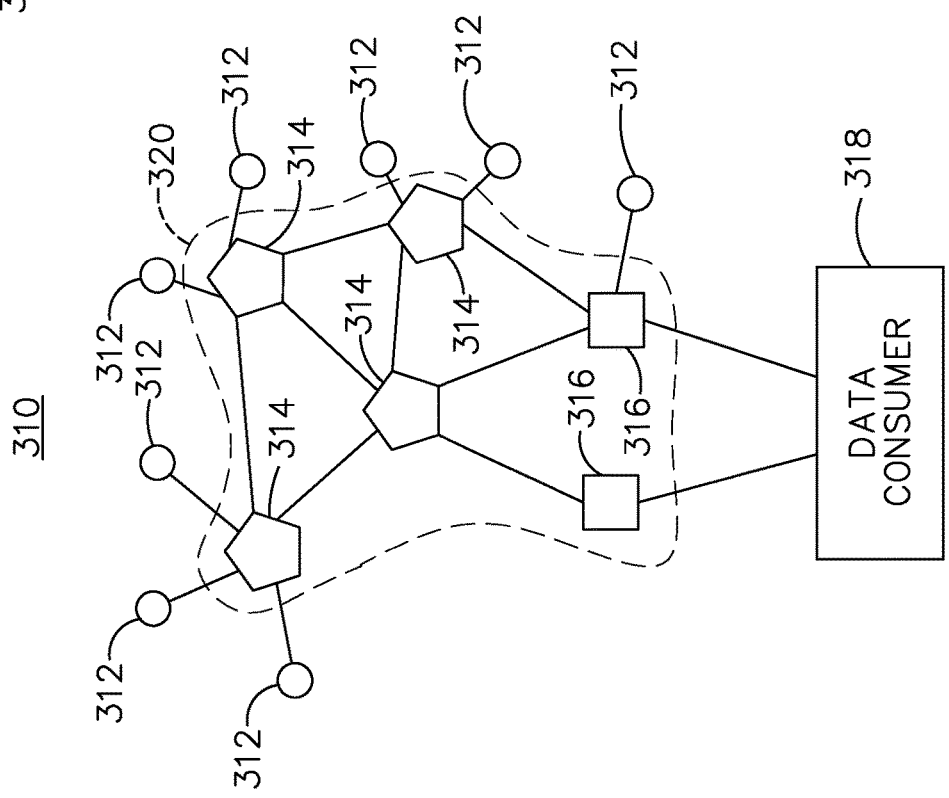
FIG. 3A is a block diagram of a wireless mesh network.

FIG. 3A is a block diagram of a wireless mesh network 310, showing links between various components as nodes within a traditional wireless mesh network topology. The wireless mesh network 310 includes a plurality of nodes within a mesh infrastructure 320 to communicate data between a plurality of end nodes 312 and a data consumer 318. The mesh infrastructure 320 includes a plurality of physical nodes, including router nodes 314 and edge router nodes 316, which are linked together with redundant data paths in a mesh network topology. The router nodes 314 communicate with the end nodes 312 and with other router nodes 314. The router nodes 314 are further configured to establish the links with the other router nodes 314 and edge router nodes 316, which may dynamically change based upon changes in the local environment (e.g., transient electromagnetic signals or shielding). The edge router nodes 316 operate in a manner similar to the router nodes 314 and additionally communicate with the data consumer 318. Thus, the edge router nodes 316 provide an access point to the mesh network infrastructure 320 to the data consumer 318. As illustrated, in some configurations, not all router nodes 314 or edge router nodes 316 are connected to end nodes 312. Instead, some router nodes 314 or edge router nodes 316 simply connect to other router nodes 314, edge router nodes 316, or data consumers 318.

FIG. 3B is a block diagram of a partially deterministic wireless mesh network 350 corresponding to the wireless mesh network 310. Unlike the traditional network topology of the wireless mesh network 310, however, the router nodes 314 and edge router nodes 316 within the mesh infrastructure 320 each directly connect to the data consumer 318. Thus, the partially deterministic wireless mesh network 350 appears as a mesh network to the end nodes 312, but the router nodes 314 and edge router nodes 316 of the mesh infrastructure 320 are each deterministically connected to the data consumer 318. As illustrated, each router node 314 is connected via a deterministic connection to a virtual router node 334 within a virtual environment 330 at the data consumer 318. Each such deterministic connection is a one-to-one connection, such that the virtual router node 334 represents the corresponding router node 314 within the virtual environment 330, as discussed further below. Likewise, each edge router node 316 is connected via a deterministic connection to a virtual edge router node 336 within the virtual environment 330 at the data consumer 318. Each such deterministic connection is a one-to-one connection, such that the virtual edge router node 336 represents the corresponding edge router node 316 within the virtual environment 330, as discussed further below. Thus, the deterministic connections between the physical nodes 314, 316 and their corresponding virtual nodes 334, 336 enable the virtual environment 330 to emulate the topology and communications within the mesh infrastructure 320. As will be discussed further below, the data consumer 318 may thus be configured to implement a virtual mesh network similar to the physical mesh network of the traditional configuration within the mesh infrastructure 320 of the wireless mesh network 310.

Figure 4:
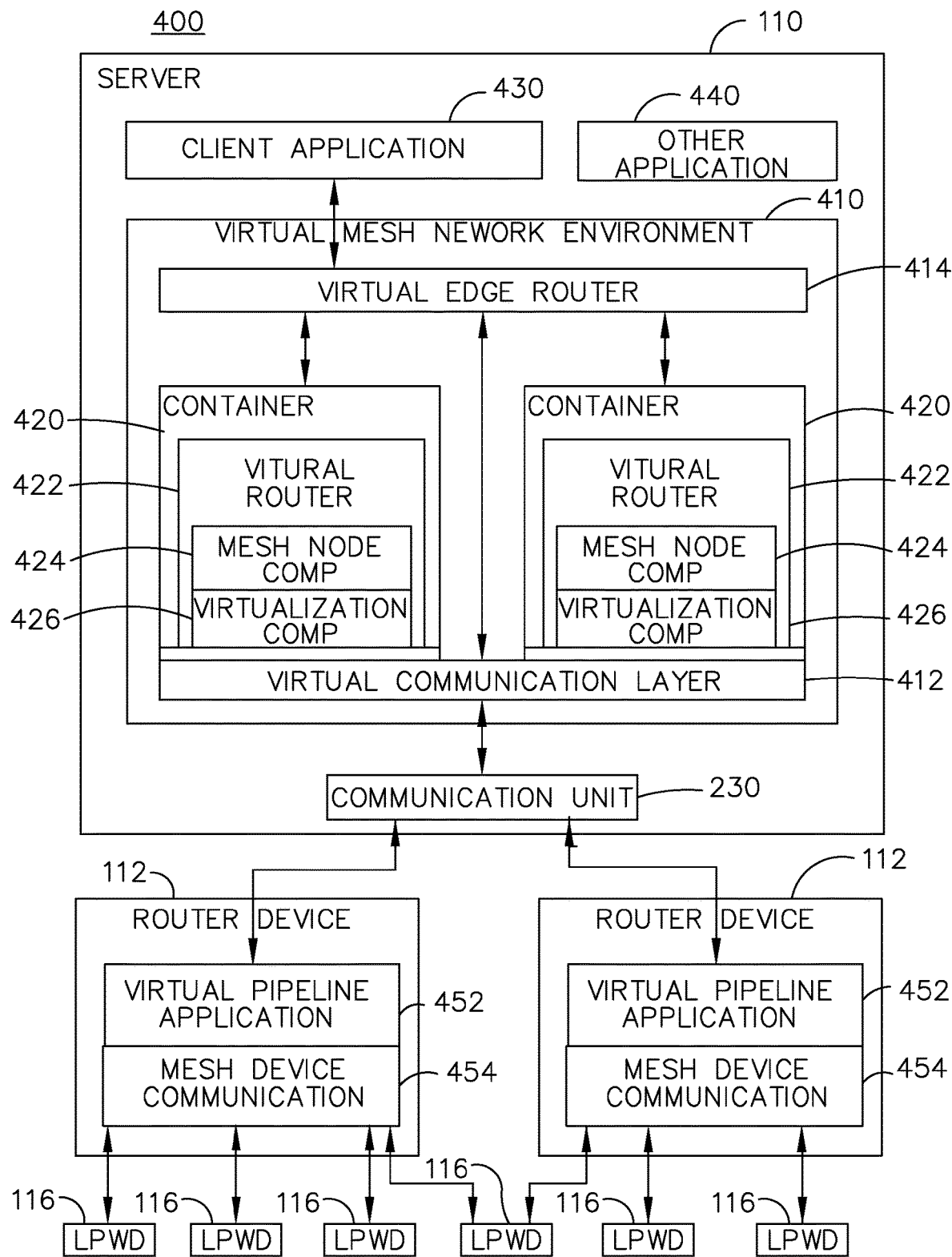
FIG. 4 is a block diagram of a wireless communication system implementing a virtual mesh network environment.

FIG. 4 is a block diagram of a wireless communication system 400 implementing a virtual mesh network environment 410. The communication system 400 includes a server 110 communicatively connected to a plurality of router devices 112 through a communication unit 230. Each router device 112 is communicatively connected to the server 110 by a deterministic connection (e.g., wired connection 114) and is further communicatively connected to at least some of the plurality of LPWDs 116 by non-deterministic connections (e.g., wireless connections 118). The LPWDs 116 provide data to the server 110 and/or receive data from the server 110 as nodes within a wireless mesh network (e.g., as end nodes 312).

Although not illustrated, it should be understood that the software components (i.e., the virtual mesh network environment 410, the client application 430, and the other applications 440) illustrated in FIG. 4 are implemented by a processor 214 of the server 110 executing computer-readable instructions stored in a program memory 212 using RAM 216 for temporary data storage. Similarly, each physical router device 112 implements its communication functions (i.e., virtual pipeline application 452 and mesh device communications component 454) as hardware-implemented logic, which may include computer-readable instructions executed by one or more processors of the router device 112. Additional or alternative embodiments of the wireless communication system 400 may include fewer, additional, or alternative components, as well as any combination of components illustrated in FIG. 4.

In order to implement virtual mesh network communications, the server 110 implements a virtual mesh network environment 410. The virtual mesh network environment 410 is configured to manage virtual mesh communication between a plurality of virtual routers 422 corresponding to the router devices 112 (e.g., the virtual router nodes 334 within the virtual environment 330 corresponding to router nodes 314 within the mesh infrastructure 320). Each virtual router 422 is communicatively connected to its corresponding router device 112 by a deterministic connection through the communication unit 230. The virtual routers 422 thus receive data from the plurality of LPWDs 116 via the deterministic connections with corresponding router devices 112, which router devices 112 communicate wirelessly with the LPWDs 116 to receive data from the LPWDs 116. Each virtual router 422 is also communicatively connected to at least one other virtual router 422 through a virtual communication layer 412 configured to route inter-router communication between the virtual routers 422. The virtual communication layer 412 manages communication between the virtual routers 422 as though the virtual routers 422 were physical routers communicating wirelessly within a mesh network (e.g., as router nodes 314 within a mesh infrastructure 320 of a wireless mesh network 310). To facilitate such communication, the virtual communication layer 412 simulates wireless communication according to wireless communication protocols within the virtual mesh network environment 410.

Each virtual router 422 thus operates as though it were its corresponding router device 112, while the inter-router communication is managed and routed within the virtual mesh network environment 410 by the virtual communication layer 412. In some embodiments, each virtual router 422 includes a mesh node component 424 to operate the virtual router 422 according to the same logic as a traditional router within a mesh network and a virtualization component 426 to handle communication with the virtual communication layer 412. Such mesh node component 424 manages non-deterministic communication according to a standard wireless mesh network protocol and standard routing logic utilized by router nodes in traditional wireless mesh networks (e.g., router nodes 314 in a mesh infrastructure 320 of a wireless mesh network 310). Thus, the mesh node component 424 implements existing mesh network software to route non-deterministic communications between the virtual router 422 and other virtual routers 422, as well as non-deterministic communication between the virtual router 422 and the LPWDs 116 associated with the router device 112 corresponding to the virtual router 422. In such embodiments, the virtualization component 426 of the virtual router 422 then serves as an interface between the mesh node component 424 and the virtual communication layer 412. Thus, the virtualization component 426 is configured to communicate with other virtualization components 426 of at least some of the other virtual routers 422 via the virtual communication layer 412. The virtualization component 426 is further configured to communicate via the deterministic connection with the router device 112 corresponding to the virtual router 422. In further embodiments, the virtualization component 426 is configured to communicate with the LPWDs 116 associated with the corresponding router device 112.

In some embodiments, each virtual router 422 is implemented within a separate container 420 running in the virtual mesh network environment 410. Running each virtual router 422 in a separate container 420 allows for simple separation of the virtual routers 422 in an environment that is inherently extensible to account for the addition or removal of virtual routers 422 as router devices 112 are added or removed, while sharing common code resources. In alternative embodiments, the virtual routers 422 may be implemented as virtual machines within a virtual environment managed by a hypervisor application to further separate the virtual routers 422. In still further embodiments, the virtual routers 422 may be implemented as objects, routines, or instances within a unified virtual environment running on the server 110.

The virtual routers 422 receive data from their corresponding router devices 112 via the deterministic connections associated with each virtual/physical router pair. In some embodiments, the virtual routers 422 also send data to the corresponding router devices 112 via the respective deterministic connections. By sending and/or receiving data through the deterministic connection, each virtual router 422 communicates with its corresponding router device 112 to synchronize the data at the virtual router 422 with the data at the corresponding router device 112. Each virtual router 422 thus receives the data from the LPWDs 116 received by the corresponding router device 112 via the deterministic connection, thereby enabling the virtual router 422 to operate within the virtual mesh network environment 410 as though it were the corresponding router device 112 within a traditional wireless mesh network (i.e., a wireless mesh network in which the router device 112 communicates directly with other router devices 112 in a wireless mesh). In some embodiments, the virtual communication layer 412 also establishes or routes part of the deterministic connection between each virtual router 422 and the corresponding router device 112. In alternative embodiments, the deterministic connections between the virtual routers 422 and the router devices 112 bypass the virtual communication layer 412 to reach the respective virtual routers 422. In either case, the deterministic connections are configured to provide a communication link between each pair of one virtual router 422 and one corresponding router device 112.

Each router device 112 communicates with one or more LPWDs 116 within the wireless mesh network. As illustrated, some LPWDs 116 may be (or may be positioned to be) communicatively connected by a wireless link (e.g., wireless connection 118) to more than one router device 112. In some embodiments, each router device 112 includes a mesh device communications component 454 configured to manage wireless communication between the router device 112 and LPWDs 116 according to wireless communication protocols. In further embodiments, each router device 112 includes a virtual pipeline application 452 configured to communicate with the corresponding virtual router 422 via the deterministic connection. Thus, the virtual pipeline application 452 routes data received from the LPWDs 116 through a virtual pipeline of the deterministic connection to the virtual router 422 via the communication unit 230, rather than to other router devices 112. For example, the virtual pipeline application 452 may route received data through a wired connection 114 to the communication unit 230 with a header or other identifier of the particular router device 112 and/or the corresponding virtual router 422 to cause the server 110 to route the data only to the virtual router 422 corresponding to the router device 112.

The virtual routers 422 may further be configured to directly or indirectly communicate received data to a client application 430 configured to use the data. In some embodiments, therefore, the server 110 implements a client application 430 that is external to the virtual mesh network environment 410 and that is configured to communicate with the virtual mesh network environment 410 to receive data from the virtual routers 422 and/or send data to the virtual routers 422. In further embodiments, the virtual mesh network environment 410 further includes one or more virtual edge routers 414 configured to communicate with at least some of the virtual routers 422 and with the client application 430 external to the virtual mesh network environment 410. In some such embodiments, each virtual edge router 414 is configured as a virtual router 422 within a container 420. In further such embodiments, each virtual edge router 414 communicates with the virtual routers 422 via the virtual communication layer 412. Implementing such virtual edge routers 414 further maintains the network topology of traditional wireless mesh networks (e.g., by maintaining virtual edge router nodes 336 in a virtual environment 330 corresponding to edge router nodes 316 in a mesh infrastructure 320), thereby requiring fewer modifications to effect virtualization of portions of such wireless mesh networks.

In some embodiments, the server 110 further stores and execute other applications 440, including networking applications, operating system applications, and/or configuration applications. In further embodiments, such configuration applications establish communication connections with the router devices 112 through the communication unit 230 in order to configure the virtual mesh network environment 410 to match the wireless mesh network topology of the physical network as indicated by the communication connections with the router devices 112. In yet further embodiments, such configuration applications generate a user interface to enable a user of the server 110 to configure the virtual mesh network environment 410.

Figure 5:
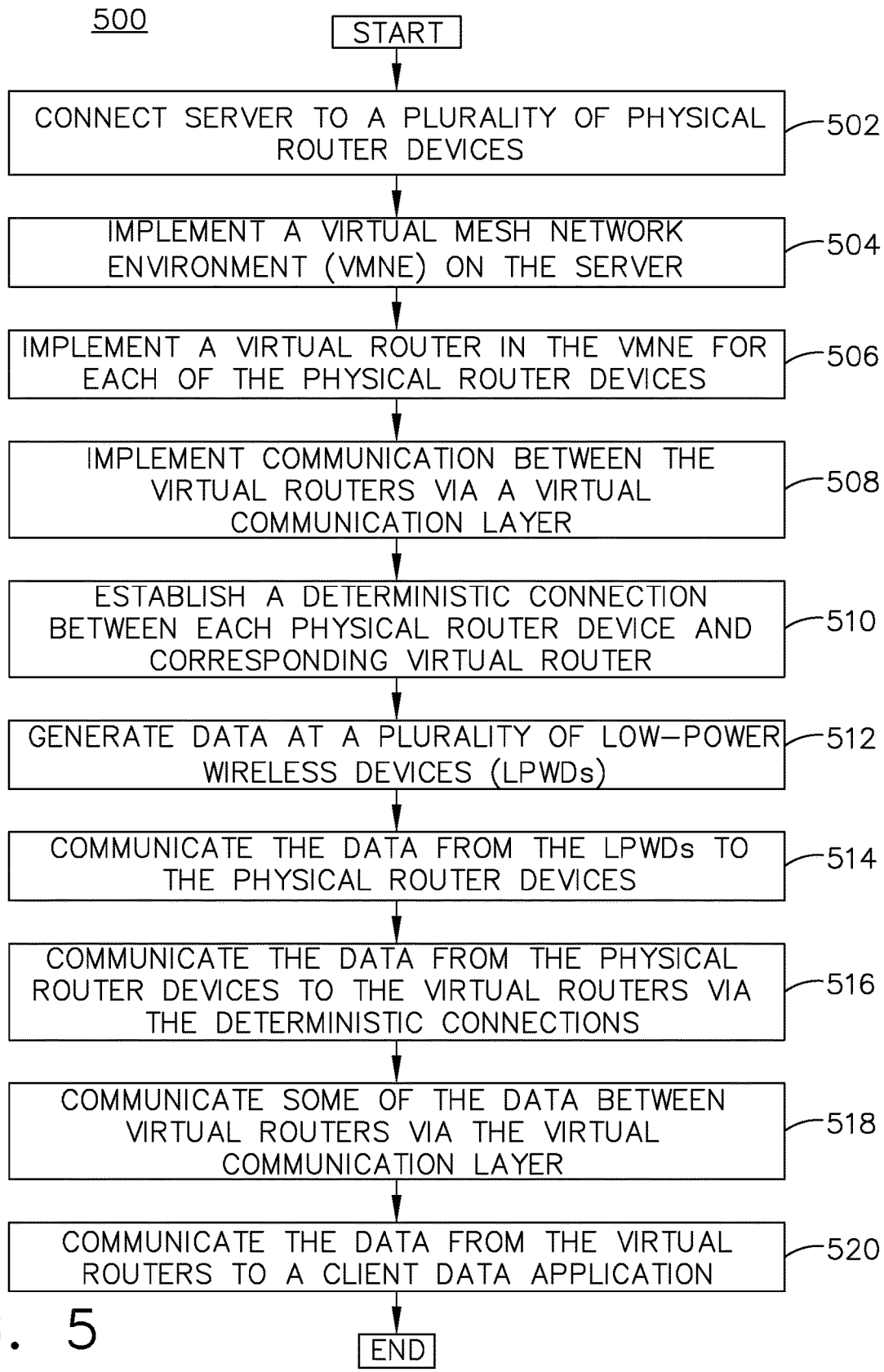
FIG. 5 is a flow diagram of a wireless mesh network virtualization method.

FIG. 5 is a flow diagram of a wireless mesh network virtualization method 500. In some embodiments, the wireless mesh network virtualization method 500 is implemented by the components of the wireless communication system 400, as described above. To facilitate virtualization of inter-router mesh network communication, the server 110 is configured to implement portions of the wireless mesh network virtualization method 500 by executing computer-readable instructions stored in a program memory 212. Additional or alternative embodiments of the wireless mesh network virtualization method 500 may include fewer, additional, or alternative actions, as well as combining actions or changing the order in which the actions are performed.

At block 502, the wireless mesh network virtualization method 500 begins with connecting the server 110 to a plurality of router devices 112, such as by one or more wired connections 114. In some embodiments, connecting the router devices 112 may include configuring communication between the communication unit 230 and the router devices 112. At block 504, the server 110 implements a virtual mesh network environment 410 to virtualize inter-router mesh network communication of the mesh network 320. Within the virtual mesh network environment 410, the server 110 implements a virtual router 422 for each of the connected router devices 112 at block 506. The virtual routers 422 may be automatically generated based upon the physical router devices 112 connected to the server 110. By generating virtual routers 422 corresponding to the router devices 112 on a one-to-one basis, the virtual routers 422 can communicate with each other within the virtual mesh network environment 410 to preserve the robustness of the mesh network. In some embodiments, the server 110 generates a separate container 420 for each virtual router 422 in order to enable the mesh node components 424 of the virtual routers 422 to run without modification from existing mesh network router software.

At block 508, the server 110 implements communication between the plurality of virtual routers 422 by implementing a virtual communication layer 412 configured to route inter-router communication between the plurality of virtual routers 422. In some embodiments, the virtual communication layer 412 is further configured to manage communication between the virtual routers 422 and the communication unit 230. In alternative embodiments, the virtual routers 422 or other applications running on the server 110 are configured to manage communication between the virtual routers 422 and the communication unit 230. At block 510, the server 110 establishes a deterministic connection between each of the virtual routers 422 and corresponding router devices 112. The deterministic connection between each pair of virtual routers 422 and router devices 112 connects the respective router device 112 to the corresponding virtual router 422 via the communication unit 230 and a deterministic physical connection (e.g., a wired connection 114), such that the virtual router 422 obtains the data received at the corresponding router device 112. In some embodiments, each router device 112 also receives data generated by or received by the corresponding virtual router 422 via the deterministic connection. The virtual router 422 is thereby enabled to communicate within the virtual mesh network environment 410 as though the virtual router 422 were the corresponding router device 112 communicating within a traditional wireless mesh network, such as wireless mesh network 310.

At block 512, the LPWDs 116 generate data within the environment of the mesh network. In some embodiments, such generated data includes sensor data generated by the LPWDs 116 based upon sensor measurements by the LPWDs 116. At block 514, the LPWDs 116 wirelessly communicate the generated data to the router devices 112 via wireless connections 118, and the router devices 112 receive the generated data transmitted by the LPWDs 116. At block 516, the router devices 112 communicate the data received from the LPWDs 116 to the corresponding virtual routers 422 running on the server 110 via the deterministic connections. In some embodiments, the router devices 112 send such data from virtual pipeline applications 452 of the router devices 112 configured to send the data to the corresponding virtual routers 422 in a deterministic manner. At block 518, the virtual routers 422 communicate at least some of the received data to other virtual routers 422 via non-deterministic communications through the virtual communication layer 412. Although communicated through the virtual communication layer 412, the virtual routers 422 communicate such data as though communicating wirelessly between router nodes 314, 316 in a physical wireless mesh network 310 according to a standard wireless mesh network protocol for non-deterministic communication. Virtualizing such communication between router devices 112 as communication between virtual routers 422 via the virtual communication layer 412 allows the application of existing wireless mesh network communication logic and software code, while reducing wireless communication in the wireless mesh network environment by using deterministic connections between the router devices 112 and the server 110.

At block 520, the virtual routers 422 communicate the data received from the LPWDs 116 (through the router devices 112 and, in some instances, through communications from other virtual routers 422 via the virtual communication layer 412) to a client application 430. As discussed above, in some embodiments, such data is communicated from the virtual routers 422 to a virtual edge router 414 via the virtual communication layer 412, which virtual edge router 414 further communicates such data to the client application 430. Such embodiments more closely match the typically configuration of router nodes 314 and edge router nodes 316 in traditional wireless mesh networks 310.

Although the foregoing describes the wireless mesh network virtualization method 500 as communicating data upstream from the LPWDs 116 and router devices 112 to the virtual routers 422 and the client application 430, further embodiments include similar communication of data or commands downstream from the client application 430 and the virtual routers 422 to the router devices 112 and LPWDs 116. Thus, the use of virtual routers 422 within a virtual mesh network environment 410 communicatively connected via one or more deterministic connections to corresponding router devices 112 reduces over-the-air wireless communication congestion for both upstream and downstream communication, while maintaining the robustness of wireless mesh networking using existing wireless mesh network protocols.

While various embodiments have been described above, this disclosure is not intended to be limited thereto. Variations can be made to the disclosed embodiments that are still within the scope of the appended claims.

What is claimed:

1. A wireless communication system, comprising:
a plurality of physical router devices configured to communicate wirelessly with a plurality of low-power wireless devices comprising low-power wireless sensors disposed within an aircraft; and
a server within the aircraft and connected to the plurality of physical router devices via a plurality of separate wired connections, the server comprising:
one or more processors;
a communication interface configured to communicate between the one or more processors and the plurality of physical router devices via a deterministic connection with each of the physical router devices; and
a computer-readable memory storing executable instructions that, when executed by the one or more processors, cause the server to implement a virtual mesh network environment, comprising:
- a plurality of virtual routers configured to communicate with the plurality of low-power wireless devices through the plurality of physical router devices, wherein each of the virtual routers corresponds to one of the physical router devices; and
- a virtual communication layer configured to route inter-router communication between the plurality of virtual routers.

2. The wireless communication system of claim 1, wherein the virtual mesh network environment is configured to implement each of the virtual routers in a separate container running in the virtual mesh network environment.

3. The wireless communication system of claim 1, wherein each virtual router of the plurality of virtual routers includes a mesh node component configured to manage non-deterministic communication (i) between the virtual router and other virtual routers of the plurality of virtual routers and (ii) between the virtual router and at least some of the plurality of low-power wireless devices, such mesh node component being configured to manage the non-deterministic communication according to a standard wireless mesh network protocol as a physical node within a wireless mesh network.

4. The wireless communication system of claim 3, wherein each virtual router further includes a virtualization component configured to communicate with the other virtual routers via the virtual communication layer.

5. The wireless communication system of claim 3, wherein each virtual router further includes a virtualization component configured to communicate with the at least some of the plurality of low-power wireless devices through the deterministic connection with the respective physical router device of the physical router devices.

6. The wireless communication system of claim 1, wherein each of the physical router devices includes a virtual pipeline application configured to communicate with the corresponding virtual router via the deterministic connection.

7. The wireless communication system of claim 1, wherein the deterministic connection includes a wired connection between the server and each of the physical router devices.

8. The wireless communication system of claim 1, wherein the virtual mesh network environment further comprises a virtual edge router configured to communicate with the plurality of virtual routers and with a client application external to the virtual mesh network environment.

9. A tangible, non-transitory computer-readable medium storing executable instructions for handling wireless communication that, when executed by at least one processor of a computer system, cause the computer system to:
- establish a deterministic connection with each of a plurality of physical router devices configured to communicate wirelessly with a plurality of low-power wireless devices; and
- implement a virtual mesh network environment, comprising:
  - a plurality of virtual routers configured to communicate with the plurality of low-power wireless devices through the plurality of physical router devices, wherein each of the virtual routers corresponds to one of the physical router devices, wherein each virtual router of the plurality of virtual routers includes a mesh node component configured to manage non-deterministic communication (i) between the virtual router and other virtual routers of the plurality of virtual routers and (ii) between the virtual router and at least some of the plurality of low-power wireless devices, such mesh node component being configured to manage the non-deterministic communication according to a standard wireless mesh network protocol as a physical node within a wireless mesh network; and
  - a virtual communication layer configured to route inter-router communication between the plurality of virtual routers.

10. The tangible, non-transitory computer-readable medium of claim 9, wherein the executable instructions cause the computer system to implement each of the virtual routers in a separate container running in the virtual mesh network environment.

11. The tangible, non-transitory computer-readable medium of claim 9, wherein each virtual router further includes a virtualization component configured to communicate with the other virtual routers via the virtual communication layer.

12. The tangible, non-transitory computer-readable medium of claim 9, wherein each virtual router further includes a virtualization component configured to communicate with the at least some of the plurality of low-power wireless devices through the deterministic connection with the respective physical router device of the physical router devices.

13. The tangible, non-transitory computer-readable medium of claim 9, wherein each virtual router of the plurality of virtual routers is configured to communicate with a virtual pipeline application of the corresponding physical router device via the deterministic connection to control the corresponding physical router device.

14. A computer-implemented method for handling wireless communication, comprising:
- implementing, by one or more processors of a server, a plurality of virtual routers within a virtual mesh network environment;
- establishing, via a communication interface of the server, a deterministic connection between each of the plurality of virtual routers and each of a plurality of physical router devices configured to communicate wirelessly with a plurality of low-power wireless devices, wherein each of the virtual routers corresponds to one of the physical router devices and is configured to communicate with the plurality of low-power wireless devices through such corresponding physical router device;
- implementing, by the one or more processors of the server, a virtual communication layer configured to route inter-router communication between the plurality of virtual routers;
- receiving, at the plurality of physical router devices, data from the plurality of low-power wireless devices;
- communicating, via the virtual communication layer, non-deterministic communication between a virtual router of the plurality of virtual routers and another virtual router of the plurality of virtual routers according to a standard wireless mesh network protocol for physical nodes within a wireless mesh network; and
- communicating, by the one or more processors of the server, the data to a client application external to the virtual mesh network environment from at least one of the plurality of virtual routers.

15. The computer-implemented method of claim 14, wherein implementing the plurality of virtual routers within the virtual mesh network environment comprises implementing each of the virtual routers in a separate container running in the virtual mesh network environment.

16. The computer-implemented method of claim 14, wherein the deterministic connection includes a wired connection between the communication interface of the server and each of the physical router devices.

17. The computer-implemented method of claim 14, further comprising:
- communicating, via the deterministic connection associated with each of the plurality of virtual routers, the data from the plurality of physical router devices to the plurality of virtual routers; and
- communicating, via the virtual communication layer, at least a part of the data between at least some of the virtual routers.

* * * * *